United States Patent [19]

Burnier et al.

[11] 3,795,116

[45] Mar. 5, 1974

[54] METHOD AND APPARATUS FOR SUPERCOOLING OF ELECTRICAL DEVICES

[75] Inventors: Pierre H. Burnier, St. Julien en Genevois; Daniel D. Bricout, Maurepas/Trappes, both of France

[73] Assignee: Societe Generale de Constructions Electriques Et Mecaniques (Alsthom), Paris, France

[22] Filed: Mar. 25, 1971

[21] Appl. No.: 127,945

[30] Foreign Application Priority Data
Mar. 31, 1970  France .............................. 70.11562

[52] U.S. Cl. .................... 62/56, 62/514, 174/15, 62/467, 62/45, 62/86, 335/216
[51] Int. Cl. ...................................................... F25d
[58] Field of Search ..... 62/514, 514 A, 467, 56, 45, 62/86; 174/15, 15 C

[56] References Cited
UNITED STATES PATENTS

| 3,162,716 | 12/1964 | Silver ................................... | 62/514 |
| 3,313,117 | 4/1967 | Hood .................................... | 62/467 |
| 3,343,035 | 9/1967 | Gerwin ................................ | 174/15 C |
| 3,456,453 | 7/1969 | Carbonell .......................... | 174/15 |
| 3,463,869 | 8/1969 | Cooley ................................ | 62/514 |
| 3,524,327 | 8/1970 | Carbonell .......................... | 62/514 |
| 3,590,597 | 6/1971 | Campbell ........................... | 62/514 |

FOREIGN PATENTS OR APPLICATIONS

| 1,164,276 | 9/1969 | Great Britain ...................... | 62/514 |

*Primary Examiner*—William J. Wye
*Attorney, Agent, or Firm*—Flynn & Frishauf

[57] ABSTRACT

To improve efficiency and space factor, compressed gas at ambient temperature is supplied to the inside of a housing which contains electrical apparatus to be operated at cryogenic temperature, the gas being expanded and supercooled inside the housing, with possible additional cooling stages located therein; heat exchangers, in the form of heat exchange shields are located within the housing intermediate the housing walls and the electrical devices to be supercooled. Typical electric devices are superconductive coils, cables and the like, the cooling fluid being conducted, if desired, through hollow portions of the devices.

19 Claims, 3 Drawing Figures

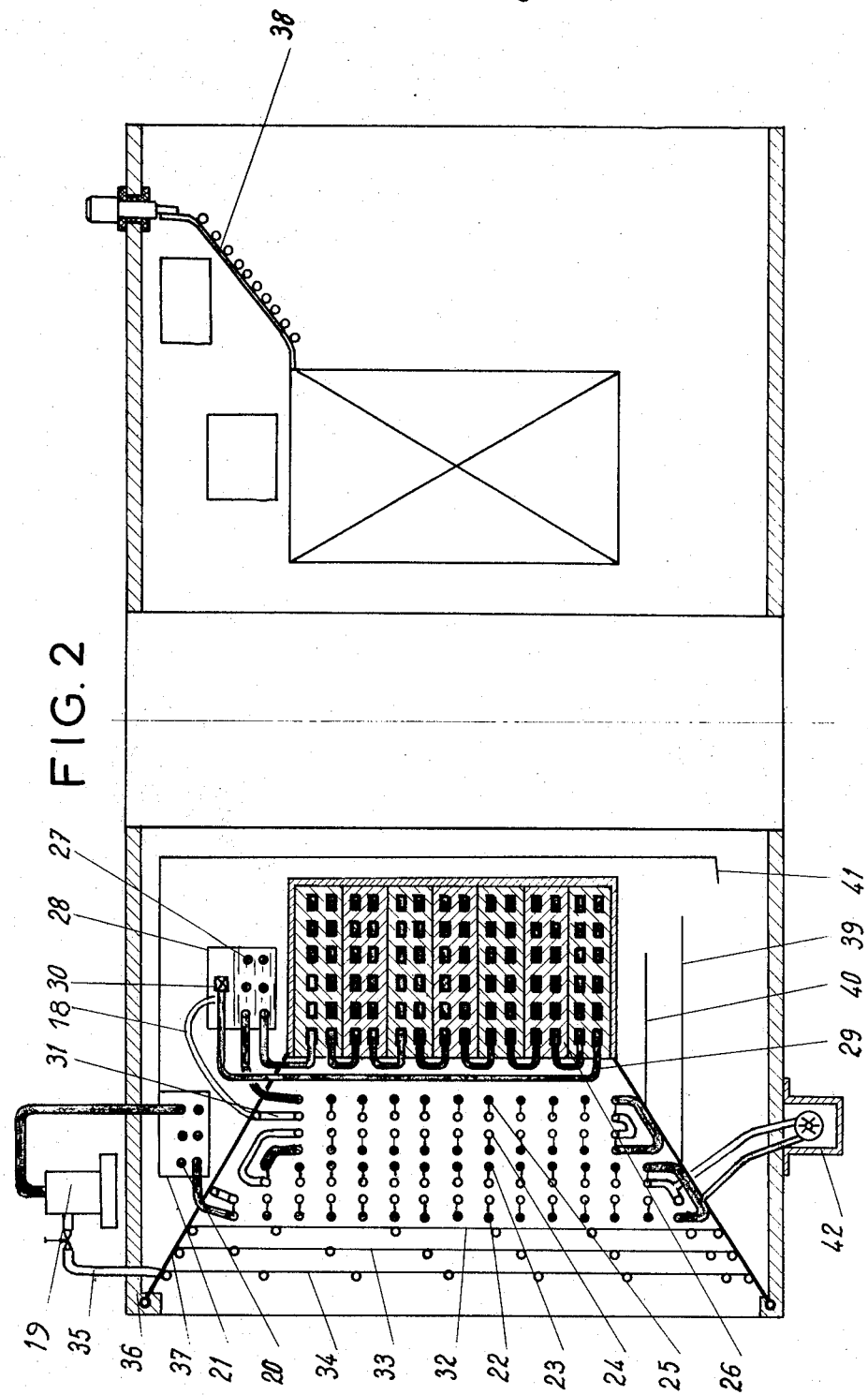

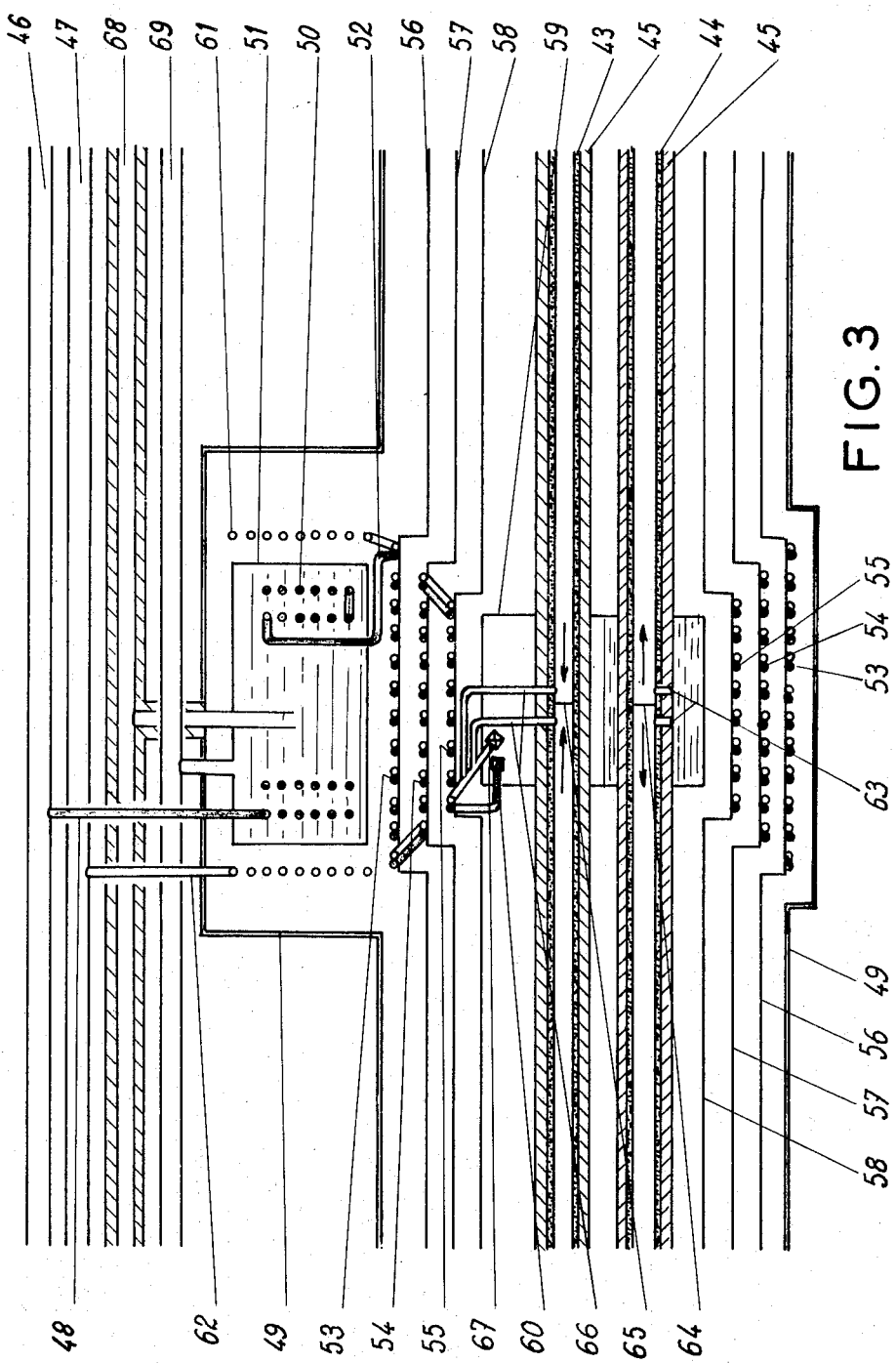

METHOD AND APPARATUS FOR SUPERCOOLING OF ELECTRICAL DEVICES

CROSS REFERENCE TO EARLIER APPLICATION

U.S. Application Ser. No. 853,178, Filed Aug. 26, 1969 (now U.S. Pat. No. 3,588,312 issued June 28, 1971)

The present invention relates to methods and apparatus for cooling electrical devices, and more particularly to superconductive electrical devices, being cooled to cryogenic temperatures.

In the usual form, cryogenic electrical apparatus such as superconductive coils, cryogenic transformers, cables and the like, were cooled by known cooling techniques which were physically separated and maintained apart from the electrical equipment itself. Thus, refrigerating machinery, gas liquefaction apparatus and the like were physically distinct from the electrical apparatus to be maintained at low temperatures. This arrangement, while permitting the use of well known and readily available equipment without modification, is unsatisfactory in various respects. It requires the duplication of elements and devices which can be common to both the electrical as well as the cooling circuit; it requires transfer conduits, heat exchange elements, cold chambers, and circulation pumps; and it complicates the apparatus which is required to maintain satisfactory temperature, as well as liquid levels.

Integrating the electrical as well as the cryogenic portions of apparatus assemblies to operate in superconductive state has the advantage of economical use of a good portion of equipment made of costly material, additionally decreases thermal losses which inevitably arise and increase with the complexity of the systems being used, it permits operation of the equipment at substantially less space requirements and further reduces the initial investment costs as well as operating costs to obtain a given amount of cooling effectiveness.

It is an object of the present invention to provide a simple, economical, and economically operating combination or assembly of cryogenic cooling apparatus and electrical devices, and methods for cooling of the apparatus, in which thermal losses are held to a minimum and in which thermal insulation is required only of an enclosure for the electrical portion.

SUBJECT MATTER OF THE PRESENT INVENTION

Briefly, an electrical device, such as a cryogenic coil, a cable, a cryotransformer or the like is located within a thermally insulated housing. It is cooled by means of heat exchange sheets or screen maintained at a temperature which effectively can be cooled by the refrigerating system available. The cooling effort or power is obtained from a gas, under pressure and at ambient temperature, which expands in the heat exchanger and in expansion valves or units, such as Joule-Thomson expanders, which are located within the same housing as the electrical apparatus to be refrigerated. The thermal screens or shields are at a temperature which is determined by contact with points selected within the heat exchange system.

Thermal losses are practically avoided since the housing encloses all elements which are at low temperatures. The losses from the electrical apparatus, which is likewise contained within the housing, will also have some thermal losses; the only cooling power which thus will have to be supplied is that which is to compensate for the thermal losses of the electrical apparatus and that of the housing itself, and to first cool the electrical apparatus and the interior of the housing, and then maintain it at the cold temperature. The gas under pressure introduced into the housing may be derived from an external source, or from vapors and gases of the cryogenic fluid itself produced within the housing and re-compressed at the exterior, or from both sources. Losses which otherwise would arise in connections from cryogenic supplies ordinarily outside of the housing need not be supplied since all low temperature effects are confined within the housing at which expansion of the compressed gas takes place, and which further contains all electrical apparatus.

At the exterior of the housing, a gas generator for the cooling gas, such as helium, hydrogen, or nitrogen, for example, or the like is provided to supply gas under pressure. This gas generator may, for example, be a battery of compressed gas bottles, a compressor with a water-cooled refrigerant, or the like. In the interior of the housing, an auxiliary bath at a temperature below that of ambient temperature outside of the housing can be maintained in which a heat exchanger is located or in which gas to be cooled circulates, the gas to be cooled already having given off an appreciable portion of its enthalpy. One or more heat exchangers may be provided in which the gas to be cooled circulates, and connected to the output of the preceding heat exchanger, and in which gases are cooled by countercurrent flow of cold gas produced within the housing. If desired, expansion apparatus providing output power can be connected to the outside of the housing, and interposed between the one or the other stages of the heat exchanger. One or more expansion nozzles can be placed at the ends of the circuit of the gas to be cooled and one or more heat exchangers can be provided to transfer cooling effort to the cryogenic fluid eventually cooling the electrical apparatus, if the cryogenic fluid is not, itself, the cooling fluid selected to be supplied by the gas source.

DRAWINGS

FIG. 2 is a schematic diagram, partly in section, illustrating cooling of a superconductive coil having hollow conductors and cooled by helium in hypercritical temperature state; and FIG. 3 is a schematic diagram, partly in section, illustrating the apparatus of the cooling system to electrical energy transmission cables operating at extremely low temperature.

Figure 1:
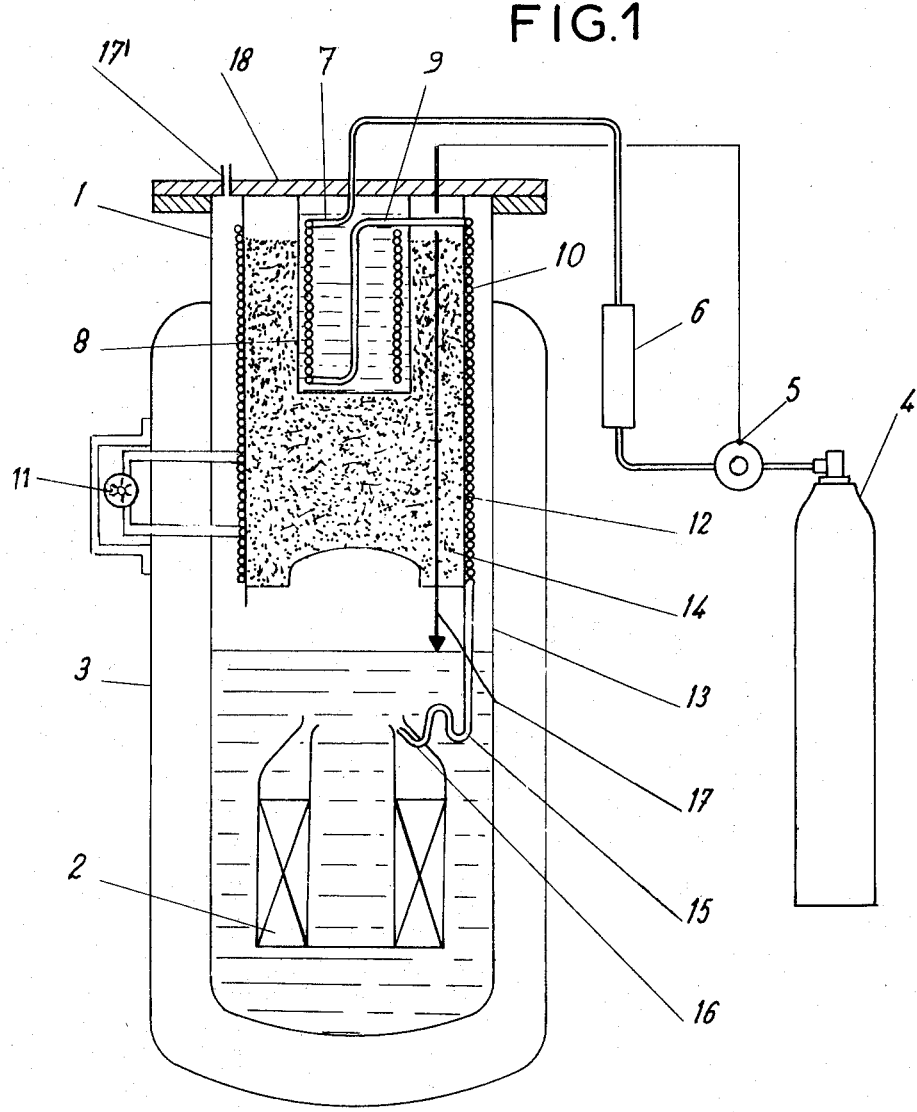
FIG. 1 is a schematic representation, partly in section, illustrating an apparatus in which the method of cooling superconductive coils, within a bath of helium at hypercritical temperature can be carried out.

Method, and embodiment of FIG. 1: A cryostat 1 has contained therein a coil 2 immersed in a bath of liquid helium. The cryostat is located within an insulated housing 3. A supply bottle 4 containing compressed helium, and having a controllable expanding valve 5 and a gas supply controller 6 is connected to the cryostat by means of a tubing. This portion of the equipment operates at ambient, room temperature. The gaseous helium, under pressure, is supplied to a heat exchanger 7 located within a chamber 8 containing liquid nitrogen.

The level thereof is regulated to have a certain height, so that the heat exchanger is always immersed, by a level control, not shown, and well known. The gas, now cooled, is taken off first heat exchanger 7 by a tubing 9 and conducted to a second heat exchanger 10, only shown in general in vertical cross-section, illustrating a spiral tubing arrangement located in the space between a tight cylinder 12 and the interior wall 13 of the cryostar. Between two selected points of the heat exchanger 10, an expansion apparatus 11, enabling external power output, is connected. The space between the cylinder 12 and the wall 13 is so small, or reduced in such a manner to effect good heat exchange between the warm gases in heat exchanger 10 and the cold gases evaporating from the liquid helium bath in which coil 2 is immersed. These gases will rise in the space between cylinder 12 and the inner wall 13. Insulation, preferably superinsulation of high effectiveness and schematically illustrated at 14 is located within cylinder 12 in order to reduce heat transfer between the liquid nitrogen chamber 8 and the cylinder 12, and so that the vapors from the liquid helium are conducted to the outside surface of the cylinder 12.

Helium under pressure is conducted from the output of the heat exchanger 10 and guided to a heat exchanger 15 located already in the bath of liquid helium in which also coil 2 is immersed. The liquid helium from heat exchanger 10 is expanded in an orifice 16 within the bath of liquid helium, or just at the surface thereof. Orifice 16 is located in a nozzle arrangement which ensures circulation of liquid helium of the bath across the cooling channels of the superconductive coils, that is, by suction provides for circulation of superconductive liquid. Such an arrangement is described in U.S. application Ser. No. 853,178, filed Aug. 26, 1969 (now U.S. Pat. No. 3,588,312) by the inventor hereof and assigned to the assignee of the present invention, which is hereby incorporated by reference. The helium under pressure and at a temperature close to 4° K is emitted from orifice 16, and cools as it expands until it is below the inversion point of helium (40° K to 50° K by Joule-Thomson expansion). The energy of expansion, originally derived from the precompression of the gas in bottle 4 produces at the orifice 16 a mixture of gaseous cold helium which joins with the helium vapors of the bath within the coil 2 and delivers its cooling effect to the helium entering in the heat exchanger 10, and the liquid helium which falls back into the helium bath within which coil 2 is immersed. The setting of valve 5, that is, its pressure reduction setting can be controlled by means of a level gauge 17, schematically indicated only, and which may be of known construction. Thus, the level of the liquid helium within the cryostat 1 can be so adjusted that the evaporation of helium from the bath, due to thermal losses, and losses within superconductive coil 2 and the electrical connections thereto (which are not shown) are compensated. The level of this bath can thus be maintained constant, at a predetermined desired height. At the cost of a first charge of liquid helium, in order to cool the coil 2 and the entire assembly, and some consumption of gaseous helium under pressure, and of liquid nitrogen, an installation is obtained which can operate without further power supply or material requirements. The gaseous helium which is evaporated from the cryostat leaves by a tube 17', formed in the closure, or cover 18 of the cryostatic assembly. Tube 17' can be connected to a recovery apparatus, to recover the helium. This apparatus is not shown and is well known, and standard in the field, in order to provide compressed helium gas for filling into bottles similar to bottle 4. Such an installation is simple and a well known article of commerce which is inexpensive. Small installations are available which can be entirely supported on the cover of cryostat 1, and are particularly applicable when a superconductive coil is to be cooled which is of comparatively small dimensions, or when the cryostat is to be used for applications of limited time duration, but still requiring liquid helium. If a large apparatus is to be maintained immersed in liquid helium, or otherwise at very low temperature, then the loss of helium through tube 17' may become commercially undesirable. In such installations a different supply than that from bottle 4 is preferred. The output 17' through which gaseous helium is derived is then connected to a compressor, replacing bottle 4, and the controller 17, determining the level of the helium within the tank then is merely connected to control operation of the compressor, or the ducting connected thereto, to supply helium under pressure, or by-pass the pressure supply to a reservoir, to control the speed of the compressor, its throughput, or the like.

The performance of the heat exchanger 10 is improved if its windings are in the form of a double tube, one tube containing gas under pressure and coming from heat exchanger 7 and being applied to heat exchanger 15; the other tube collecting cold gas under low pressure evaporating from the helium liquid bath and interconnected in the plenum above the liquid bath before gaseous helium is conducted to outlet tube 17', and before it can be exhausted therefrom, or recycled by means of a compressor.

Embodiment of FIG. 2: A superconductive coil having hollow conductors is cooled by circulating therein helium at hypercritical temperature. A compressor 19 is connected to conduct helium under elevated pressure, for example 20 to 30 bars, to an annular piping 20, located within a housing, or manifold 21 and filled with liquid nitrogen. Helium within tubes 20 is thus cooled to a temperature of about 77° K. It is then conducted by high-pressure tubes to a series of heat exchanger tubes 22, 23, 24, 25, coaxially located, just like housing 21, with respect to a superconductive coil 26 and surrounding the coil with respect to the outside of the entire structure assembly. The heat exchangers, due to their location intermediate the inner walls of the housing surrounding the assembly act as screens contributing to the thermal insulation of the superconductive coil 26. The helium is removed from coil 26 under an intermediate pressure, for example from 10 to 15 bars, and at a temperature only slightly higher to that of 4.2° K. It is conducted at that temperature by means of piping 27 into a bath of liquid helium within an annular container 28. The piping 27 is then connected to the interior of the hollow conductors of the superconductive coil 26, to cool the superconductors therein, and to expand, absorbing heat (and thus cooling) within the superconductor 26. At the outlet from the coil 26, the helium is still under some pressure, for example from 5 to 10 bars. Piping 29 takes the helium from the interior of the hollow conductors to the annular housing 28 where it is expanded in a Joule-Thomson expansion valve 30, thus forming the liquid helium which provides the constant level of the helium within the housing 28.

The helium vapors within the housing, and produced by the expansion, are conducted by means of piping 31 to low-pressure heat exchange circuits 25, 24, 23, 22, from which they are then conducted by means of cooling conduits cooling the thermal screen 32, 33, 34 before being re-cycled to compressor 18 by an output tube 35.

The superconductive coil 26 is mechanically held within an outer annular housing 36 by straps, such as strap 37. The straps and the electrical connection, such as an electrical connection illustrated schematically at 38 for the superconductive coil 26 are thus cooled at connection points with the ends of the heat exchangers 25, 24, 23, 22, as well as with screens 32, 33, 34, with which they form thermal transfer contacts. Thus, the thermal losses contributed by the holding devices for the coils are greatly reduced. The heat exchangers and screens 25, 24, 23, 22; 32, 33, 34, themselves, form an excellent thermal insulation between coil 26 and the interior of the housing 36, particularly at the external side thereof. This thermal insulation can be extended by additional screens such as screens 39, 40, 41, thermally connected either to common points with heat exchangers 22, 23, 24, 25, or to the annular housing 21 containing the liquid nitrogen. In order to improve the thermo-dynamic efficiency of the entire installation, one or more exteriorly accessible expansion valves with exterior control, or work output can be connected in the fluid circuit, such as those illustrated at 42, in which a bypass between high pressure (shown in dark lines on FIG. 2) and low pressure, controllable by element 42, is illustrated.

The assembly of the electrical devices within the housing, and the cooling arrangement as shown in FIG. 2 and described in connection therewith, provides for very low thermal losses. All the cold parts of the entire assembly are within the housing, so that the overall thermal losses are reduced to a minimum value. Besides this advantage, the various elements can be mechanically and electrically interconnected into a simple, unitary assembly, economically utilizing a given space and decreasing overall costs of manufacture, as well as of its operation.

Embodiment of FIG. 3: The present invention is equally applicable to cool electrical cables to transport electrical energy, and operating at low temperature, for example at cryogenic temperature. This application illustrates, specifically, the advantages of the present invention besides its inherent technological importance. Up to the present, electrical cables operating at low temperature have been so arranged that a large number of cooling or refrigerating elements, each one independently operated, are placed along the length of the cable. Each one of these cooling elements, of limited cooling power, supplies cooling fluid to maintain the length of the cable at low temperature. Such a length may reach several tens of kilometers. The various cooling and refrigerating stations, staggered along the length of the cable, provide for cooling of its entire length and to decrease the losses due to loading and maintain the cooled condition of the cable along its entire length.

In accordance with the present invention, it is only necessary to place cooling equipment at one, or the other end or, if desired, at both ends of the cable. The cable itself is formed of hollow conductors 43, 44, covered with electrical insulation 45. A compressor of appropriate power, not shown in FIG. 3, is provided to supply gas at high pressure to tubing 46, and to receive gas, at low pressure, from output tubing 47. Both tubes 46, 47 are at ambient temperature. It is thus not necessary that refrigerating equipment be installed in staggered places along the length of the cable. It is only necessary to install, from time to time, along the length of the cable, cooling equipment such as one of the arrangements illustrated, by way of example, in FIG. 3. Similar cooling assemblies can then be installed along the length of the cable, none of which require any specific motive power supply and none of which require a separate compressor for outside refrigeration installations. The gas, under high pressure in conduit 46, is introduced by means of a connection stub 48 (shown darkened in FIG. 3 to illustrate the high pressure to the individual cooling elements). The high-pressure gas is conducted by the stub 48 tapped into line 46 through a housing enclosure 49. Preferably, enclosure 49 is cylindrical and a vacuum is maintained therein to further improve heat insulation. the high-pressure gas is conducted into heat exchanger 50, located in the interior of a housing 51 containing a cryogenic fluid at intermediate temperature. Liquid nitrogen can be used if the conductors of the cable are to be maintained at a temperature of liquid hydrogen or liquid helium. At the output of heat exchanger 50, the gas at high pressure is conducted by piping 52 into a series of heat exchanger coils 53, 54, 55, soldered, sweated or welded on heat exchange plates or screens 56, 57, 58. These screens are perforated to permit evacuation of the entire space within housing 59, and so that a vacuum will extend up to the tight interior surface of housing 49, and, on the other side, to the airtight external surfaces of the hollow conductors 43, 44. The tubing, or piping of heat exchangers 53, 54, 55 can be extended by a simple go-and-return circuit of great length, in contact with screens 56, 57, 58, from one or another location at the exterior of the central zone shown in FIG. 3, so that the screens efficiently are cooled along the length of the cable. At the outlet of the high-pressure heat exchanger 55, the gas is expanded in a separating chamber 59 by a Joule-Thomson expander 60. The gas thus produces on the one hand cryogenic liquid, and on the other cold vapors which are conducted by low-pressure tubes to heat exchangers 55, 54, 53 and then by means of conduit 61, forming a thermal screen within the housing 51, towards return stub 62 tapped into return line 47. The cryogenic liquid is circulated by the pressure within the separating chamber 59 across the channel 63 arranged within the electrical insulation 45 and of the conductors 44, into the central region of the hollow conductor 44. This channel is, at the application point of the cryogenic liquid, separated by a separating plate or vane 64, and the liquid will thus diverge into two opposite directions. The liquid return circuit is over an appropriate piping, not shown, and connecting the interior duct of conductor 44 with that of the interior duct of conductor 43 at the end of the zone to be cooled by the specific cooling assembly illustrated in FIG. 3, and returned, in counterflow, through the interior conductor 43. It is removed from the channel within the conductor 43, more or less vaporized, adjacent a central block 65, similar to vane 64 and removed by means of tubing 66, rejoining the input to the low-pressure circuit at heat exchanger 55. It is circulated by the difference of pressure between the input to the separating chamber 59 by means of a control valve 67.

Various changes and modifications may be made in the structures illustrated. In particular, three-phase transmission can be used. If the cable of FIG. 3 has three conductors, or even more, vaporized liquid can be returned from a zone surrounding the conductors towards the equipment as shown, rather than through a second return conductor; alternatively, it may be applied, through each conductor, after expansion to another assembly structure similar to that illustrated in FIG. 3 and located along the length of the cable. Since, eventually, the gas will always be taken from the conduit 46 and returned to conduit 47, at ambient temperature, pressure balances, as well as volume and mass balances can be satisfied. If necessary, expansion controls, automatically responsive to pressure differences and operating within the cooled zones, or externally accessible can be interconnected at suitable places within the heat exchangers or along the length of the cables, as desired.

The cryogenic fluid of intermediate temperature within the vessel 51 is derived from a thermally isolated duct 68. Its vapors are re-circulated towards the generator producing the fluid, not shown, by means of ducting 69. The pre-cooling of the fluid is not necessary in all installations. The intermediate temperature fluid may be omitted if the cable can be cooled effectively without pre-cooling of the liquid, in the light of the overall economics of installation, as well as the efficiency of its operation.

Cooling of transmission cables, as illustrated in FIG. 3, has a number of advantages: All rotating equipment which requires maintenance, particularly the compressor, as well as remote control and remote measuring equipment can be located at one end of the transmission cable and not be split up at numerous points along the length of the cable. A single compressor can be used, of substantially higher power capacity than the various compressors which have to be staggered along the length of the cable. Not only is the first cost of a single high power compressor less than that of a number of smaller compressors, but also the operation, and efficiency of operation of a single machine is greater. The fluid to be transmitted which produces the cooling effect is transported at ambient temperature along the length of the cable, and not, even for short stretches, in the form of a cooled liquid. Thus, unnecessary and excessive heat losses are avoided. The housing surrounding the cable at the same time encloses all the elements which are supercooled, so that thermal losses are further decreased. The space between the housing and the cable itself can be subdivided in various temperature zones by screens maintained at various temperature levels, and, conveniently located in cascade. The piping of these heat exchangers may readily be extended along the length of these subdividing screens or shields if the temperature difference between adjacent screens, or elements, such as described for example in FIG. 3, exceeds the level at which mere insulation and spacing is sufficient. Thermal losses can additionally be avoided by insulation. The elements themselves, of course, can be maintained in aligned relatively spaced location by spacer rings, spacer inserts or spiders as well known in the art.

A cooling assembly, as illustrated in FIG. 3, can be economically made and its cost is much less than that required for a cooling compressor and refrigerating assembly staggered along the length of the cable, particularly if the additional structural requirements, control and supervision circuits and power supplies for additional refrigeration equipment are considered. It is thus possible to maintain a cable of substantial length at extremely low operating temperature.

The present invention is applicable to the cooling of various types of equipment; for example, superconductive rotating equipment can likewise be cooled in accordance with the present invention. An induction-type alternator can be constructed, in which the cooling arrangement in accordance with the present invention is so built that an axis of symmetry for the heat exchangers is provided, about which the cooling apparatus of the present invention can turn. Alternatively, a portion of the heat exchangers may be fixed and another portion movable, to be connected to gas derived from the fixed heat exchanger which is already partly cooled below ambient temperature.

Various changes and modifications can be made in the structure of the present invention, and in the methods of its application to cool electrical equipment. The enlargements in the housing 49 (FIG. 3) which enclose the cooling arrangements can be duplicated along the length of the cable, spaced in accordance with cooling and temperature requirements.

We claim:

1. Method of supercooling electrical apparatus to cryogenic temperatures, said apparatus being contained within a thermally insulated housing, said housing having thermal shields formed therein, said method comprising the steps of compressing a gas at ambient temperature to provide cooling gas under pressure and at ambient temperature;

conducting said compressed gas, at ambient temperature, to within the housing;

locating said thermal shields between the interior walls of the housing and said electrical apparatus within the housing;

expanding said gas and cooling said thermal shields located intermediate the electrical apparatus and the interior housing walls by heat exchange contact with the expanding gas;

and further expanding said gas and cooling said apparatus within said housing by heat exchange with said further expanding gas, to effect the entire cooling cycle, as well as thermal shielding of the cooled apparatus, within said housing enclosing said electrical apparatus.

2. Method according to claim 1, including the step of conducting said gas, under pressure, to consecutively connected stages of a heat exchanger.

3. Method according to claim 1, including the step of conducting at least part of the gas from a heat exchanger located interiorly of the housing to an expansion means accessible from outside said housing;

re-introducing said expanded gas into the housing;

and expanding said gas within said expansion means accessible from outside the housing.

4. Method according to claim 1, including the step of re-cycling at least part of the expanded cooled gas within said housing and conducting said at least part of the gas in heat exchange relation within said housing to said gas cooling the apparatus, to pre-cool said gas.

5. Method according to claim 1, including the step of pre-cooling the compressed gas before expansion by an auxiliary cooling fluid.

6. Method according to claim 5, wherein the compressed gas to be expanded is helium and the auxiliary cooling fluid is nitrogen.

7. Method according to claim 5, wherein the compressed gas to be expanded and the auxiliary cooling fluid are of the same constituency and are derived from a single source.

8. Supercooled electrical apparatus assembly comprising
a housing;
an electrical device located in said housing;
a source of compressed gas, at ambient temperature, connected to said housing;
heat shields located within said housing between the inside walls thereof and said electrical apparatus contained therein, said heat shields having, at least over part of their surface, heat exchange fluid conductors applied thereto;
means conducting cooling fluid through said heat exchange fluid conductor;
and expansion means located within said housing, said expansion means being connected to said source of compressed gas to expand said gas and thereby obtain cooling thereof, the expanded cooled gas cooling said electrical devices and additionally cooling said heat exchange shields.

9. Assembly according to claim 8, wherein said heat exchange fluid conductors form, at least in part, said expansion means, expansion of compressed gas within said heat exchange fluid conductors effecting cooling of said heat shields.

10. Assembly according to claim 8, wherein said heat exchange fluid conductors form successive stages of heat exchange means.

11. Assembly according to claim 8, including compressed gas expansion means accessible from outside of said housing and producing work output, said expansion means being connected in the fluid circuit of said compressed gas, to simultaneously provide work output as well as expansion of said gas.

12. Assembly according to claim 8, including means located within said housing adapted to receive gas derived from cooling liquid within said housing;
and means connected to said gas receiving means and conducting said gas, in heat exchange relation, to the compressed gas introduced into said housing.

13. Assembly according to claim 8, wherein said electrical device comprises a cable formed of hollow conductors; said housing comprises a thermally insulated enclosure;
at least one compressed gas supply duct and one gas removal duct located along the length of said cable, said ducts being located outside of said thermally insulated housing;
tap stubs interconnecting said ducts to within said housing, along the length of the cables;
said heat exchange fluid conductors being located adjacent said tap stubs and connected thereto, said heat shields forming thermal screens of fixed temperature, the temperature being determined by contact with said fluid conductors applied thereto and forming, at least in part, heat exchangers;
and means interconnecting the fluid conductors to the interior of said hollow cables, said gas expanding within said hollow cables as well as within said fluid conductors.

14. Assembly according to claim 13, wherein said housing, along its length, is formed with enlargements, said enlargements enclosing said heat exchange fluid conductors applied to said heat shields, and said stubs.

15. Assembly according to claim 14, including a plurality of enlargements, placed along the length of the cable, said enlargements being interconnected by said ducts and, each, including said heat exchange fluid conductors and connection means to said hollow cables.

16. Assembly according to claim 8, wherein said electrical device comprises a superconductive coil;
said housing comprises a thermally insulated vessel containing therein liquid cryogenic fluid, said superconductive coil being located within said fluid, said fluid being located at the lower portion of said vessel;
and an auxiliary fluid container located at the upper portion of said vessel and forming a preliminary heat exchanger, means introducing gas from said source of compressed gas into said preliminary heat exchanger for liquefaction;
and thermal insulation means surrounding said auxiliary container, said thermal insulation means forming between the outside thereof and the inside walls of said vessel, a passage for vapors from the cryogenic fluid in the lower portion of said vessel;
and means effecting heat exchange between said vapor from said bath of cryogenic liquid and gas conducted through and then out of said auxiliary container.

17. Assembly according to claim 16 including duct means conducting compressed gas from said source through said auxiliary container, and then through the space between said insulation means for said auxiliary container and the inside walls of said vessel, to form a heat exchange duct for heat exchange of said gas with vapors from said bath of cryogenic liquid, the compressed gas being conducted by said duct downwardly with respect to said vessel, to provide cooling of the gas therein by counterflow with respect to said vapor;
the space between the inside walls of said vessel and said ducts being narrow to form intimate thermal contact between said ducts carrying the compressed gas and the vapors derived from the cryogenic liquid in the bottom of said vessel.

18. Assembly according to claim 8, wherein said electrical device comprises a coil having hollow conductors;
said housing comprises a thermally insulated vessel;

said shields and said heat exchange fluid conductors form at least one heat exchanger, connected to said source of compressed gas;
a container for cryogenic liquid is provided within said housing;
and duct means are provided, connected to said source and conducting compressed gas from said source at ambient temperature, to within said housing, and then, successively, to the heat exchangers, through the cryogenic liquid container, and to the interior of the conductors of the coil, the diameters of said ducts and said coils being selected to provide for expansion and partial liquefaction of said gas, said gas being then conducted to said container for cryogenic liquid, additional expansion taking place to provide for additional cryogenic liquid therein;

and means collecting the vapors from the cryogenic liquid within said container and conducting said vapors in heat exchange relation to said heat exchanger.

19. Assembly according to claim 18, wherein a plurality of heat shields are located within said housing and between said housing and said coil; said heat shields having heat exchange fluid conductors applied thereto and being successively connected to said duct means conducting compressed gas therethrough while said gas is expanding to cool said heat shields and, further, conducting gas collected from said cryogenic liquid through fluid conductors applied to said heat shields to additionally effect exchange between the fluids in said fluid conductors.

* * * * *